United States Patent
Liu et al.

(10) Patent No.: US 10,643,666 B2
(45) Date of Patent: May 5, 2020

(54) VIDEO PLAY METHOD AND DEVICE, AND COMPUTER STORAGE MEDIUM

(71) Applicant: TENCENT TECHNOLOGY (SHENZHEN) COMPANY LIMITED, Shenzhen (CN)

(72) Inventors: Yongfeng Liu, Shenzhen (CN); Hui Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/963,963

(22) Filed: Apr. 26, 2018

(65) Prior Publication Data

US 2018/0261256 A1 Sep. 13, 2018

Related U.S. Application Data

(63) Continuation of application No. PCT/CN2017/085784, filed on May 24, 2017.

(30) Foreign Application Priority Data

May 25, 2016 (CN) .......................... 2016 1 0352685

(51) Int. Cl.
*G11B 27/34* (2006.01)
*H04N 21/431* (2011.01)
(Continued)

(52) U.S. Cl.
CPC ............ *G11B 27/34* (2013.01); *G11B 27/105* (2013.01); *H04N 21/4312* (2013.01);
(Continued)

(58) Field of Classification Search
CPC ............... G11B 27/34; H04N 21/4126; H04N 21/41407; H04N 21/47217;
(Continued)

(56) References Cited

U.S. PATENT DOCUMENTS

2009/0327893 A1* 12/2009 Terry .................... G06F 3/1438
  715/719
2015/0195601 A1* 7/2015 Hahm ................ H04N 21/4122
  725/116
(Continued)

FOREIGN PATENT DOCUMENTS

CN   104243668   12/2014
CN   104469511   3/2015
(Continued)

OTHER PUBLICATIONS

International Search Report dated Aug. 15, 2017 in PCT/CN2017/085784 filed May 24, 2017. (With English Translation).

*Primary Examiner* — Thai Q Tran
*Assistant Examiner* — Syed Y Hasan
(74) *Attorney, Agent, or Firm* — Oblon, McClelland, Maier & Neustadt, L.L.P.

(57) ABSTRACT

A method and an apparatus for playing a video are described. In an example, processing circuitry of the apparatus acquires, when the video is switched from a first application interface to a second application interface, first progress information and first position information of the video in the first application interface. The first position information is indicative of a first video playback window in the first application interface. Then, the processing circuitry resumes playing the video in the second application interface according to the first progress information. Further, the processing circuitry acquires, when the video is switched from the second application interface to the first application interface, second progress information of the video in the second application interface. The processing circuitry determines the first video playback window according to the first position information, and resumes playing the video in the
(Continued)

first video playback window according to the second progress information.

20 Claims, 4 Drawing Sheets

(51) Int. Cl.
  *H04N 21/8547* (2011.01)
  *G11B 27/10* (2006.01)
  *H04N 21/845* (2011.01)
  *H04N 21/472* (2011.01)
  *H04N 21/858* (2011.01)

(52) U.S. Cl.
  CPC ... *H04N 21/47217* (2013.01); *H04N 21/8456* (2013.01); *H04N 21/8547* (2013.01); *H04N 21/8586* (2013.01)

(58) Field of Classification Search
  CPC ............ H04N 21/4858; H04N 21/8586; G06F 3/1454; G06F 3/147; G09G 2370/16
  USPC ........................... 386/241; 345/2.3; 715/719
  See application file for complete search history.

(56) References Cited

U.S. PATENT DOCUMENTS

2015/0293741 A1\* 10/2015 Glazer ................. G06F 3/1454
  345/2.3
2017/0169856 A1   6/2017 Wang

FOREIGN PATENT DOCUMENTS

| CN | 104965693 | 10/2015 |
| CN | 105847996 | 8/2016  |

\* cited by examiner

VIDEO PLAY METHOD AND DEVICE, AND COMPUTER STORAGE MEDIUM

RELATED APPLICATION

This application is a continuation of International Application No. PCT/CN2017/085784, filed on May 24, 2017, which claims priority to Chinese Patent Application No. 201610352685.5 filed on May 25, 2016. The entire disclosures of the prior applications are hereby incorporated by reference in their entirety.

FIELD OF THE TECHNOLOGY

The present disclosure belongs to the technical field of communication, and particularly relates to a video play method and device, and a computer storage medium.

BACKGROUND OF THE DISCLOSURE

With the development of network technology and the enhancement of intelligence degree of terminal devices, more and more terminal applications can operate in terminal devices, for example, watching a video on a mobile terminal by using a multimedia player, etc.

At present, when a user shifts from one terminal interface to another terminal interface to watch the video, he has to reload the web page, i.e., when shifting from one play scene (e.g., application interface) to another, the play of the video cannot be intelligently resumed from the breakpoint. If the user clicks the video area on the homepage of a mobile application A, he will enter a video floating layer table to watch the video; when returning to the previous page after the video floating layer table is closed, the mobile phone needs to reinitialize the player and reload the video; and since the video is replayed, the video data will be re-downloaded under the condition of resuming playing, so the play effect is poor, and lots of data will be consumed.

SUMMARY

The embodiments of the present disclosure expect to provide a video play method and device, and a computer storage medium, aiming to improve the video play effect and reduce the data consumption at the time of play scene shifts.

A method and an apparatus for playing a video are described. In an example, processing circuitry of the apparatus acquires, when the video is switched from being played in a first application interface to being played in a second application interface on a display screen, first progress information and first position information of the video in the first application interface. The first position information is indicative of position information of a first video playback window for the video in the first application interface. Then, the processing circuitry resumes playing the video according to the first progress information in the second application interface. Further, the processing circuitry acquires, when the video is switched from being played in the second application interface to being played in the first application interface, second progress information of the video in the second application interface. The processing circuitry determines the first video playback window in the first application interface according to the first position information, and resumes playing the video in the first video playback window in the first application interface according to the second progress information.

To resume playing the video according to the first progress information in the second application interface, in an example, the processing circuitry determines a first video segment of the video according to the first progress information, and configures the second application interface as a video output interface. Then, the processing circuitry outputs the first video segment to the video output interface to resume playing the video in the second application interface.

To resume playing the video in the first video playback window in the first application interface according to the second progress information, in an example, the processing circuitry determines a second video segment in the video according to the second progress information, and configuring the first application interface as the video output interface. Then, the processing circuitry outputs the second video segment to the video output interface to resume playing the video in the first application interface.

To determine the first video playback window in the first application interface according to the first position information, in an embodiment, the processing circuitry acquires a window link address from the first position information, and switches to the first video playback window in the first application interface according to the window link address. In another embodiment, the processing circuitry acquires a positioning point according to the first position information and determines the first video playback window in the first application interface according to the positioning point.

According to an aspect of the disclosure, before the video is switched from being played in the second application interface to being played in the first application interface, in an example, the processing circuitry acquires second position information. The second position information is indicative of position information of a second video playback window for the video in the second application interface. Then, after the video is resumed in the first video playback window in the first application interface, the processing circuitry determines the second video playback window in the second application interface according to the second position information when the video is switched from being played in the first application interface to being played in the second application interface.

In an embodiment, the processing circuitry also adjusts a size and a position of a view area of the first video playback window according to a size of the video.

The disclosure also provides a non-transitory computer-readable medium storing instructions. The instructions can be executed by a computer to cause the computer to perform the method for playing the video.

In the video play method and device, and the computer storage medium according to the embodiments of the present disclosure, acquire first progress information and first position information of a video played in a first scene when the video play scene shifts from the first scene to a second scene, the first position information being position information of a video play window in the first scene; resume playing the video according to the first progress information in the second scene; determine the video play window in the first scene according to the first position information and acquire second progress information of the video played in the second scene when the video play scene shifts from the second scene back to the first scene; and resume playing the video in the video play window in the first scene according to the second progress information. According to the embodiments of the present disclosure, when shifting from the second scene back to the first scene, since the video play window of the scene can be quickly determined according to the position information of the first scene, a player does not need to be reinitialized, and thus, video pictures can be output to the video play window of the first scene uninterruptedly, thereby implementing seamless shift of the play scenes and resuming of video play, improving the video play effect and reducing the data consumption.

BRIEF DESCRIPTION OF THE DRAWINGS

Various embodiments of this disclosure that are proposed as examples will be described in detail with reference to the following figures, wherein like numerals reference like elements, and wherein.

DESCRIPTION OF EMBODIMENTS

Please refer to the accompanying drawings in which the same component reference symbol represents the same component, and the principles of the present disclosure are illustrated by being implemented in a proper computing environment. The following description is based on the exemplary embodiments of the present disclosure, but should not be considered as limits to other embodiments that are not specified herein.

In the following description, unless otherwise stated, the embodiments of the present disclosure shall be described with reference to steps and symbols executed by one or more computers. Therefore, it will be mentioned for multiple times that these steps and operations are executed by a computer, and the execution by the computer herein includes operations of computer processing units of electronic signals which represent data in a structured form. The operation converts the data or maintains the data in the position in the memory system of the computer. The operation of the computer may be changed by reconfiguration or in an additional manner that is well-known by a tester in the art. The data structure maintained by the data is the physical position of the memory, and has features defined by the data format. However, the principles of the present disclosure are described by the texts above, and do not represent a limitation. A tester in the art can understand that the following multiple steps and operations may also be implemented in hardware.

The term "module" used herein may be considered as a software object executed in an arithmetic system. The different components, modules, engines and services herein may be considered as implementation objects in the arithmetic system. The device and method herein are implemented in a manner of software, and surely may be implemented on hardware. Both of the manners fall into the protection scope of the present disclosure.

The embodiments of the present disclosure provide a video play method and device, and a computer storage medium.

Figure 1A:
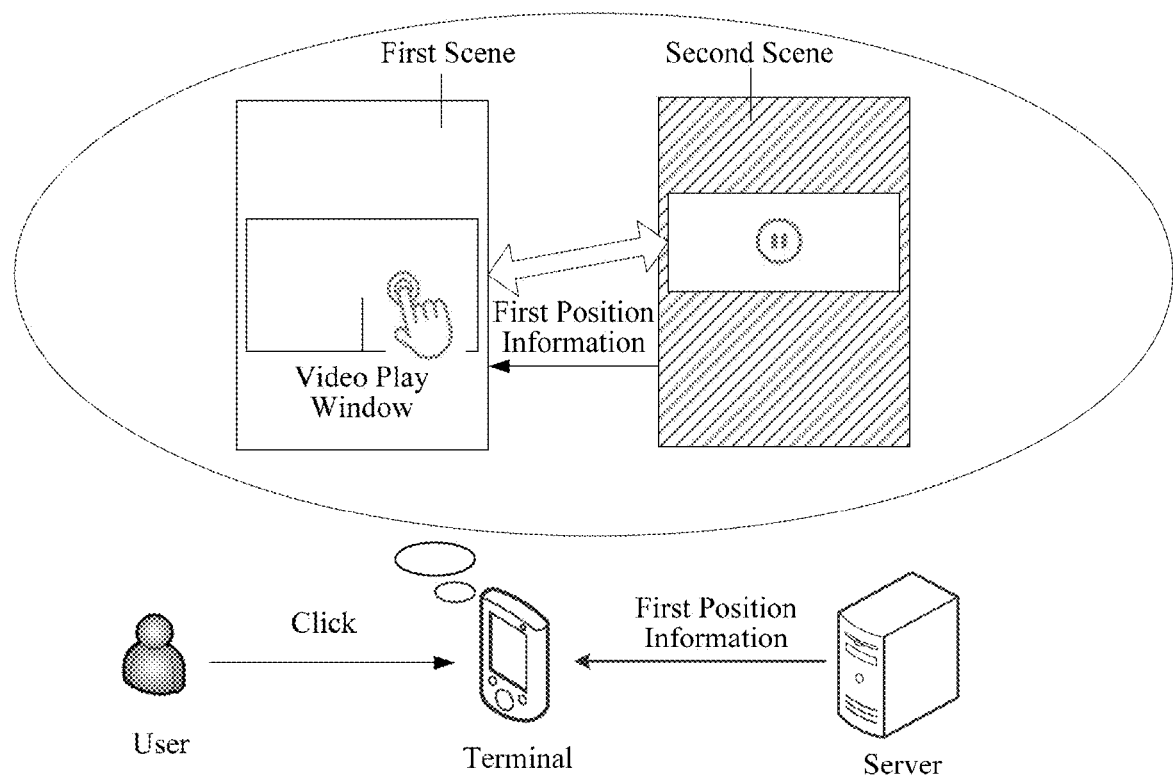
FIG. 1a is a scene schematic diagram of a video play method according to the embodiments of the present disclosure.

Refer to FIG. 1a, which is a scene schematic diagram of the video play method according to the embodiments of the present disclosure. The scene (e.g., application interface) can include a video play (or playback) device, the video play device can be integrated into a terminal, and the terminal can be a personal computer, such as a mobile phone, a notebook computer, a tablet computer and the like. Taking the video play device being integrated into the terminal as an example, as shown in FIG. 1a, firstly acquire first progress information and first position information of the video played in a first scene when the interface of the terminal shifts from the first scene to a second scene, wherein the first position information being position information of a video play window in the first scene; then the terminal resumes playing the video according to the first progress information in the second scene; determine the video play window in the first scene according to the first position information and acquire second progress information of the video played in the second scene when the interface shifts from the second scene back to the first scene; and finally, resume playing the video in the video play window in the first scene according to the second progress information, and the like.

In addition, the scene can also include other devices, such as a server which is mainly used for recording and storing position information of the video play scene and giving feedback to the terminal so that the terminal determines the video play (or playback) window of the corresponding play scene according to the position information, etc., wherein the video play window is a display window corresponding to a multimedia player and mainly used for playing the video in the current play scene.

Detailed description shall be made as follows.

In an embodiment, the description shall be made from the perspective of the video play device. The video play device, can be integrated into a terminal and other devices, such as a mobile phone, a notebook computer, a tablet computer and the like.

A video play method, including: acquire first progress information and first position information of a video played in a first scene when the video play scene shifts from the first scene to a second scene, the first position information being position information of a video play window in the first scene; resume playing the video according to the first progress information in the second scene; determine the video play window in the first scene according to the first position information and acquire second progress information of the video played in the second scene when the video play scene shifts from the second scene back to the first scene; and resume playing the video in the video play window in the first scene according to the second progress information.

Figure 1B:
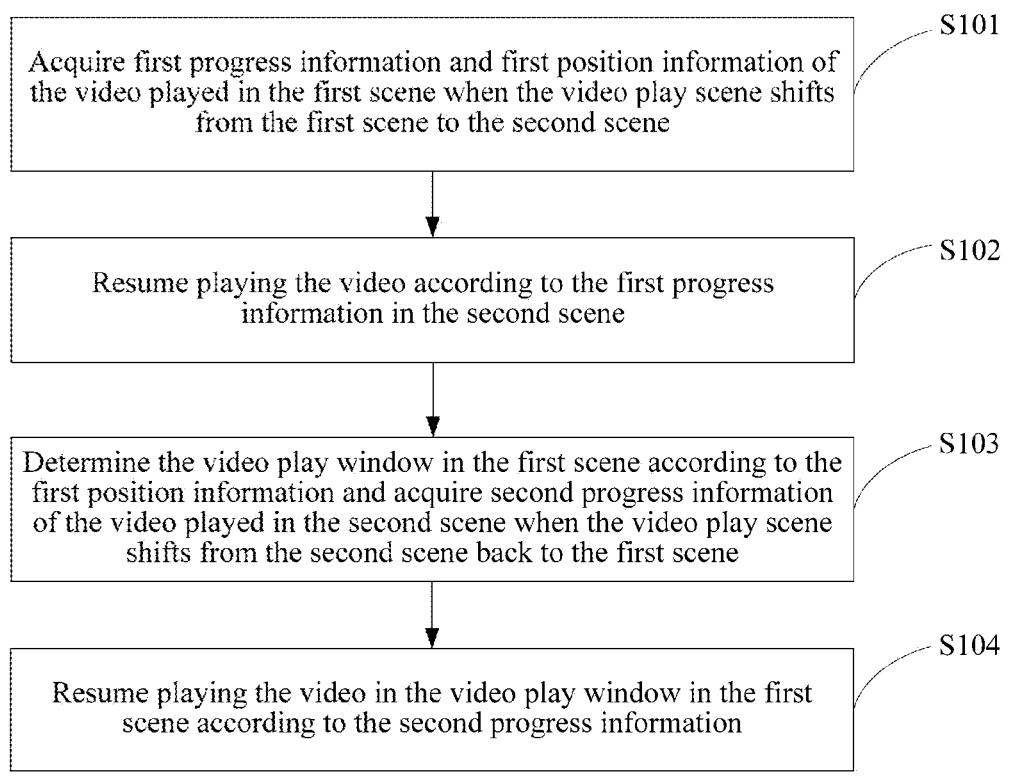
FIG. 1b is a process schematic diagram of a video play method according to the first embodiment of the present disclosure.

Please refer to FIG. 1b which is a process schematic diagram of the video play method according to the first embodiment of the present disclosure. The method includes:

In step S101, acquire first progress information and first position information of a video played in a first scene when the video play scene shifts from the first scene to a second scene, the first position information being position information of a video play window in the first scene.

It may be understood that the scene according to the embodiment of the present disclosure is the video play scene of the terminal, for example, may include a scene where video play is carried out on the homepage of a certain terminal application, a scene where video play is carried out when jumping from the homepage of a certain terminal application to a sub-interface (such as a video recommendation floating layer and the like), etc.

As an implementation manner, each video play scene can correspond to one video play interface, and the shift of the terminal from the first scene to the second scene may refer to the shift of the terminal from one video play interface to another video play interface. For example, set a video play window on the homepage of a certain terminal application, wherein the homepage can be used as a video play scene (or video play interface), and the video play window is a display window of a multimedia player in the video play scene, and is mainly used for playing a video in the current play scene; and when a user clicks the video play window, a preset trigger control or the like, the terminal interface shifts to another video play scene.

In the embodiment of the present disclosure, the first position information refers to position information of the video play window in the first scene, i.e., the position information refers to the position information of the video play window in the corresponding scene, and each video play scene corresponds to one piece of position information, wherein the position information may include a window link address, an interface positioning point and the like.

In step S102, resume playing the video according to the first progress information in the second scene.

For example, resume playing the video according to the first progress information in the second scene after the terminal shifts from the first scene to the second scene, wherein the first progress information refers to progress information of playing in the first scene before the shift of the video play scene, such as time information, progress identifier, video link or the like, so as to determine the contents of the video played in the second scene.

As an implementation manner, the step of resuming playing the video according to the first progress information in the second scene by the terminal may include:

Step S1021: Determine a corresponding first video segment according to the first progress information.

Step S1022: Invoke a preset video output interface, and render the first video segment into the second scene so as to resume playing the video in the second scene.

In the implementation manner, the terminal firstly determines the corresponding first video segment according to the acquired first progress information in the second scene, i.e., determines the video segment played in the second scene according to the first progress information, and furthermore, can invoke the preset video output interface (such as "setSurface( )") through the multimedia player and render the first video segment into the second scene through the preset video output interface.

It is noted that the terminal also invokes the preset video output interface in the first scene through the multimedia player and renders the video to be played into the first scene before shifting from the first scene to the second scene; and the terminal enters the second scene after the user triggers the terminal to shift from the first scene to the second scene, and at this time, the same method is adopted to draw the video into the second scene, thereby resuming playing the video in the second scene.

In step S103, determine the video play window in the first scene according to the first position information and acquire second progress information of the video played in the second scene when the video play scene shifts from the second scene back to the first scene.

It may be understood that many ways can be used for determining the video play window in the first scene according to the first position information, for example, in some implementation manners, the ways may include:

(1) acquire a corresponding window link address according to the first position information.

(2) jump to the video play window in the first scene according to the window link address.

For example, establish the corresponding relation between the video play window in the first scene and the window link address in advance, such as a relation mapping table in which the video play window can be identified as "01"; and search the identifier "01" corresponding to the window link address in the mapping table when the terminal acquires the window link address, such as a Uniform Resource Locator (URL), thereby quickly jumping to the video play window in the first scene.

For another example, in some implementation manners, the ways may include:

(a) acquire a corresponding positioning point according to the first position information; and (b) determine the video play window in the first scene according to the positioning point.

For example, the first position information may include window end points, a window center point and other position information, and the terminal acquires the corresponding positioning point according to the first position information, thereby determining the corresponding video play window in the first scene.

In some implementation manners, the terminal can record and store the first position information when shifting from the first scene to the second scene, and thus, can directly find the video play window of the video played in the current scene according to the recorded first position information when shifting from the second scene to the first scene, and at this time, the multimedia player can uninterruptedly draw the contents of the video into the first scene; in the meanwhile, the terminal needs to acquire the second progress information of the video played in the second scene, thereby determining the contents of the video needs to be played in the first scene.

In step S104, resume playing the video in the video play window in the first scene according to the second progress information.

It may be understood that the step of resuming playing the video in the video play window in the first scene by the terminal may include:

step S1041: Determine a corresponding second video segment according to the second progress information; and step S1042: Invoking the preset video output interface, and rendering the second video segment into the video play window in the first scene so as to resume playing the video in the first scene.

In the implementation manner, the terminal determines the corresponding second video segment according to the acquired second progress information after shifting from the second scene back to the first scene, i.e., determines the video segment played in the first scene according to the second progress information, and furthermore, can invoke the preset video output interface (such as "setSurface( )") through the multimedia player and render the second video segment into the first scene through the preset video output interface.

It is noted that the terminal also invokes the preset video output interface in the first scene through the multimedia player and renders the video to be played into the first scene before shifting from the second scene back to the first scene.

As an implementation manner, the terminal enters the first scene after the user triggers the terminal to shift from the second scene back to the first scene, and the same method is adopted to draw the video into the first scene, i.e., directly output the video in the video play window after determining the video to be played in the current scene according to the second progress information of the video played in the second scene, thereby resuming playing the video in the first scene. Compared with the condition that the user needs to manually replay the video and the terminal reloads the video in the existing scene shift process, the technical solutions according to the embodiments of the present disclosure are more convenient, and have better video play efficiency and play effect.

As an implementation manner, the contents of the video can be replaced manually by the user or automatically by the terminal in the scene shift process. Since each video source may have a different size, the size and position of a view area of the video may change accordingly, and therefore, the method may also include: adjusting the size and position of the view area of the video play window according to the size of the played video.

As an implementation manner, before the video play scene of the terminal shifts from the second scene back to the first scene, the method may also include: acquiring second position information, the second position information being position information of a video play window in the second scene; in other words, the video play window in the second scene can be determined according to the second position information when the terminal shifts from the first scene to the second scene after resuming playing the video in the video play window in the first scene, thereby implementing seamless shift between the first scene and the second scene.

In addition, the terminal can firstly record and save the first position information when shifting from the first scene to the second scene, and similarly, can firstly record and save the second position information when shifting from the second scene to the first scene, so as to directly find the corresponding video play window according to the first position information (or second position information) and play the video without reloading the video when shifting back to the first scene (or second scene).

Afterwards, the terminal can automatically clear the record of the first position information and/or the second position information when receiving an operating instruction for stopping video play, so as to release the storage space of the terminal.

In conclusion, the video play method according to the embodiment includes: firstly acquiring the first progress information and the first position information of the video played in the first scene when the video play scene shifts from the first scene to the second scene, the first position information being position information of the video play window in the first scene; resuming playing the video according to the first progress information in the second scene; determine the video play window in the first scene according to the first position information and acquiring the second progress information of the video played in the second scene when the video play scene shifts from the second scene back to the first scene; and finally, resuming playing the video in the determined video play window in the first scene according to the second progress information. According to the embodiments of the present disclosure, when the video play scene shifts from the second scene back to the first scene, since the video play window of the scene can be quickly determined according to the position information of the first scene, the player does not need to be reinitialized, and thus, video pictures can be output to the video play window of the first scene uninterruptedly, thereby implementing seamless shift of the play scenes and resuming of video play, improving the video play effect and reducing the data consumption.

According to the method in the foregoing embodiments, detailed description shall be illustrated as follows.

In the embodiment, the description shall be made by taking the video play device integrated into the terminal as an example. The terminal may include a display module, a multimedia play module and a storage module, wherein the display module includes a terminal interface A corresponding to Play Scene A and a terminal interface B corresponding to Play Scene B. Each video play scene can correspond to one video play interface, for example, the shift from Play Scene A to Play Scene B may refer to shift of the terminal from the terminal interface A to the terminal interface B.

Figure 2A:
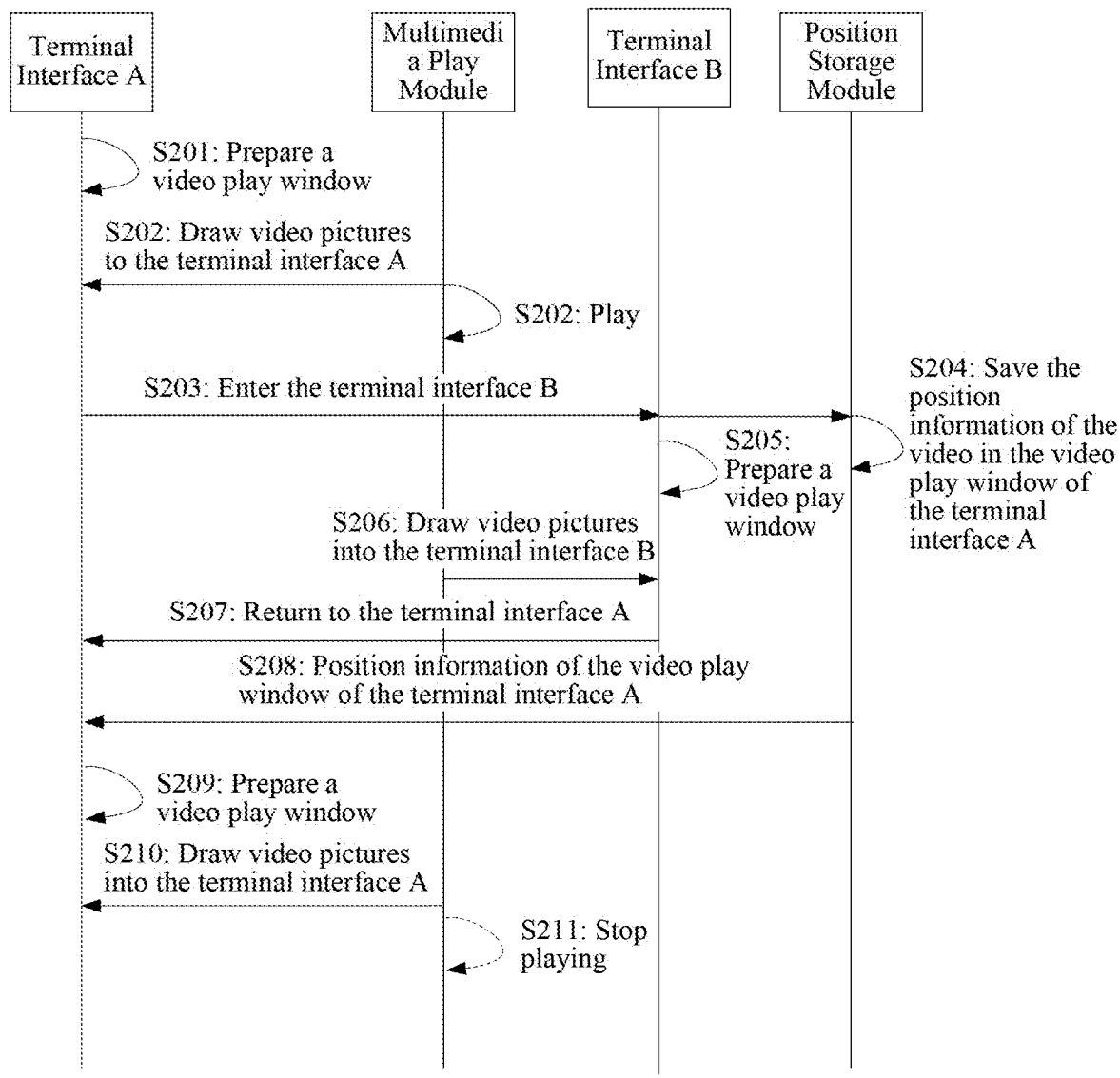
FIG. 2a is a process schematic diagram of a video play method according to the second embodiment of the present disclosure.

Please refer to FIG. 2a which is a process schematic diagram of the video play method according the second embodiment of the present disclosure, wherein the method mainly includes: (1) playing the video in the terminal interface A; (2) playing the video in the terminal interface B; (3) playing the video back into the terminal interface A; and (4) stopping playing the video.

(1) The step of playing the video in the terminal interface A includes:

S201: The terminal interface A prepares a video play window.

S202: The multimedia play module draws video pictures into the terminal interface A and plays the video pictures.

For example, in the terminal interface A, the video is played on the homepage of a terminal application a, and the terminal interface A invokes an interface of a video play preparation area (such as "prepareVideoArea( )") to prepare the video play window, wherein the video play window can visualize and display the multimedia play module in the form of multimedia playing so as to control the play, pause, fast forward, fast backward and the like of the video.

As an implementation manner, the multimedia play module invokes a video picture output interface (such as "setSurface( )") to draw the contents of the video to the video play window of the terminal interface A after the terminal interface A finishes preparing the video play window, so as to play the video.

(2) The step of playing the video in the terminal interface B includes:

S203: The user clicks the video play window in the terminal interface A and enters the terminal interface B.

S204: A position storage module saves the position information of the video in the video play window of the terminal interface A.

S205: The terminal interface B prepares a video play window.

S206: The multimedia play module draws the video pictures into the terminal interface B.

For example, the terminal jumps from the terminal interface A to the terminal interface B when the user clicks the play area of the video play window in the terminal interface A, a preset trigger control or the like, and shifts to the terminal interface B if the terminal interface A invokes a preset video play scene shift interface, such as "changeToVideoList".

In the embodiment, the jump of the terminal from the terminal interface A to the terminal interface B can be understood as the shift of the terminal from Play Scene A to Play Scene B. For example, Play Scene A is the scene where video play is carried out on the homepage of a certain terminal application, and the Play Scene B is the scene where video play is carried out after jumping from Play Scene A to the sub-interface (such as a video recommendation floating layer and the like).

At this time, the position storage module (namely Area Holder) saves area information of the video played in the terminal interface A, and the position storage module invokes a preset storage interface "saveOldArea( )" to save the position information of the video play window, each video play window corresponds to one piece of position information, wherein the position information can include a window link address, an interface positioning point and the like.

The terminal interface B starts to prepare the video play window of the current scene after the user clicks to shift to the terminal interface B, and the multimedia play module draws the video into the second scene by adopting the same method after the preparation is finished, thereby resuming playing the video in the terminal interface B. For example, invoke a video picture output interface "setSurface( )" to draw the contents of the video to the video play window of the terminal interface B, so as to resume playing the video.

(3) The step of playing the video back into the terminal interface A includes:

S207: The user clicks to exit the terminal interface B and return to the terminal interface A.

S208: The position storage module sends the position information of the video play window of the terminal interface A to the terminal interface A.

S209: The terminal interface A prepares a video play window according to the position information.

S210: The multimedia play module draws the video pictures into the terminal interface A.

For example, the user clicks the play area of the video play window in the terminal interface B, a preset trigger control or the like to exit the terminal interface B and return to the previous interface (terminal interface A), and at this time, the storage module sends the position information of the video play window of the terminal interface A to the terminal interface A, so that the terminal interface A can reacquire the video play window of the terminal interface A according to the position information, so as to resume playing the video.

As an implementation manner, the position information of the video play window may be a window link address, and each video play window corresponds to one window link address. For example, the video play window can be identified as "01" and the window link address of the terminal interface A is "www.12345video.com", the corresponding identifier "01" can be searched out through the window link address when determining to return to the terminal interface A, thereby quickly jumping to the video play window in the terminal interface A.

As an implementation manner, the position information may include window end points, a window center point and the like. When determining to return to the terminal interface A, the terminal interface A can acquire the corresponding positioning point according to the position information, thereby determining the corresponding video play window in the interface.

The multimedia play module can draw the contents of the video into the video play window uninterruptedly after the terminal interface A directly acquires the video play window in the scene according to the position information.

(4) The step of stopping playing the video includes:

S211: Stop playing the video if the terminal interface A receives a play stop operation.

As an implementation manner, the user can stop playing the video in the terminal interface shift process, and can repeat the process above from step S201 if receiving a video play instruction again after the play is stopped, which is not further described herein.

As an implementation manner, the terminal can acquire the position information of the video play window in the terminal interface B before shifting from the terminal interface B back to the terminal interface A, for example, the storage module invokes a preset storage interface "saveNewArea( )" to save the position information of the video play window of the terminal interface B; that is to say, the terminal can determine the video play window in the scene according to the position information of the video play window in the terminal interface B when shifting from the terminal interface A to the terminal interface B again after the video play window in the terminal interface A resumes playing the video, thereby implementing seamless shift between the terminal interface A and the terminal interface B.

Figure 2B:
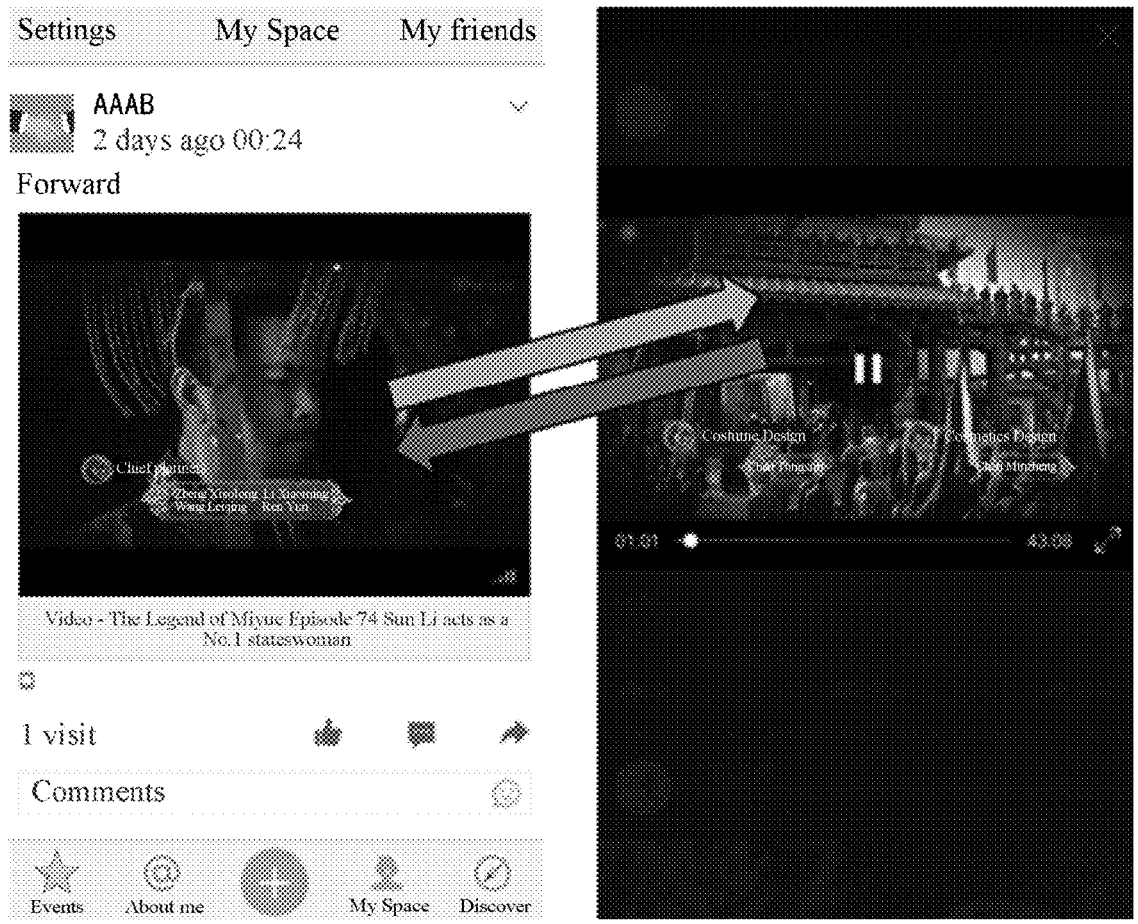
FIG. 2b is an interface schematic diagram of the video play method according to the second embodiment of the present disclosure.

It may be understood that in the terminal interface shift process, the contents of the video to be played in the next terminal interface need to be determined according to the progress information (such as time information, progress identifier or the like) of the video played in the previous terminal interface. FIG. 2b only shows the implementation of the shift of terminal interfaces. In addition, the contents of the video can be replaced manually by the user or automatically by the terminal. Since each video source may have a different size, the size and position of the view area of the video may change accordingly, and therefore, the method may also include: adjusting the size and position of the view area of the video play window according to the size of the video played currently.

In the embodiments of the present disclosure, after the user triggers the terminal to shift from the terminal interface B back to the terminal interface A, the terminal enters the terminal interface A and determines the video to be played in the current scene according to the progress information of the video played in the terminal interface B, and the multimedia play module invokes the same interface (such as "setSurface( )") to draw the video into the terminal interface A, i.e., directly output the video in the video play window of the terminal interface A, thereby resuming playing the video; compared with the condition that the user needs to manually replay the video and the terminal reloads the video in the existing scene shift process, the method according to the present disclosure is more convenient, and has better video play efficiency and play effect.

Refer to FIG. 2b which is a terminal interface schematic diagram of the video play method according to the embodiments of the present disclosure, wherein the interface on the left is a dynamic interface of "My Space" of a mobile terminal, the video play window in the dynamic interface is playing the video "The Legend of Miyue Episode 74", the interface will enter a video recommendation floating layer interface (such as the interface on the right) when the user clicks the video play window in the dynamic interface, and the video recommendation floating layer interface resumes playing the video "The Legend of Miyue Episode 74"; further, the mobile phone interface returns to the previous interface ("My Space" dynamic interface) and resumes playing the video "The Legend of Miyue Episode 74" in the dynamic interface when the user clicks a zoom button in the video recommendation floating layer interface to exit the video recommendation floating layer interface; that is to say, the video shifts seamlessly between the two interfaces without reloading the video, so the network data is saved, and in addition, the condition of re-caching cannot occur in the video shift process between the two scenes, so the user experience is good.

In conclusion, the video play method according to the embodiment includes: firstly acquiring the first progress information and the first position information of the video played in the first scene when shifting from the first scene to the second scene, the first position information being position information of the video play window in the first scene; resuming playing the video according to the first progress information in the second scene; determining the video play window in the first scene according to the first position information and acquiring the second progress information of the video played in the second scene when shifting from the second scene back to the first scene; and finally, resuming playing the video in the determined video play window in the first scene according to the second progress information. According to the embodiments of the present disclosure, when shifting from the second scene back to the first scene, since the video play window of the scene can be quickly determined according to the position information of the first scene, the player does not need to be reinitialized, and thus, video pictures can be output to the video play window of the first scene uninterruptedly, thereby implementing seamless shift of the play scenes and resuming of video play, improving the video play effect and reducing the data consumption.

In order to better implement the video play method according to the embodiments of the present disclosure, the embodiments of the present disclosure also provide a device based on the video play method, in which the meanings of nouns are the same as those in the video play method. For implementation details, please refer to the description in the embodiments of the method.

Figure 3A:
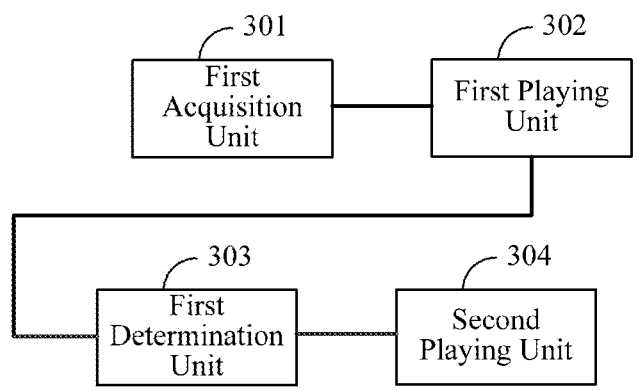
FIG. 3a is a structural schematic diagram of a video play device according to the third embodiment of the present disclosure.

Please refer to FIG. 3a which is a structural schematic diagram of the video play device according to the embodiments of the present disclosure. The video play device may include a first acquisition unit 301, a first playing unit 302, a first determination unit 303 and a second playing unit 304.

Wherein the first acquisition unit 301 is configured to acquire first progress information and first position information of a video played in a first scene when the video play scene shifts from the first scene to a second scene, the first position information being position information of a video play window in the first scene; and the first playing unit 302 is configured to resume playing the video in the second scene according to the first progress information.

It may be understood that the scene according to the embodiment of the present disclosure is the video play scene of the terminal, for example, may include the scene where video play is carried out on the homepage of a certain terminal application, the scene where video play is carried out when jumping from the homepage of a certain terminal application to the sub-interface (such as a video recommendation floating layer and the like), etc.

As an implementation manner, the shift of the terminal from the first scene to the second scene may refer to the shift of the terminal from one video play interface to another video play interface. For example, set a video play window on the homepage of a certain terminal application, wherein the homepage can be used as a video play scene (or video play interface), and the video play window is a display window of a multimedia player in the video play scene, and is mainly used for playing a video in the current play scene; and when the user clicks the video play window, a preset trigger control or the like, the terminal interface shifts to another video play scene.

In the embodiment of the present disclosure, the first position information refers to position information of the video play window in the first scene, i.e., the position information refers to the position information of the video play window in the corresponding scene, and each video play scene corresponds to one piece of position information, wherein the position information may include a window link address, an interface positioning point and the like.

Afterwards, the first determination unit 303 is configured to determine the video play window in the first scene according to the first position information and acquire second progress information of the video played in the second scene when the video play scene shifts from the second scene back to the first scene; and the second playing unit 304 is configured to resume playing the video in the video play window in the first scene according to the second progress information.

For example, resume playing the video according to the first progress information in the second scene after the video play scene of the terminal shifts from the first scene to the second scene, wherein the first progress information refers to progress information of the video played in the first scene, such as time information, progress identifier, or the like.

The first playing unit 302 can be configured to determine a corresponding first video segment according to the first progress information; invoke a preset video output interface, and render the first video segment into the second scene so as to resume playing the video in the second scene.

In other words, the terminal firstly determines the corresponding first video segment according to the acquired first progress information in the second scene, i.e., determines the video segment played in the second scene according to the first progress information, and furthermore, can invoke the preset video output interface (such as "setSurface( )") through the multimedia player and render the first video segment into the second scene through the preset video output interface.

It is noted that the terminal also invokes the preset video output interface in the first scene through the multimedia player and renders the video to be played into the first scene before shifting from the first scene to the second scene; and the terminal enters the second scene after the user triggers the terminal to shift from the first scene to the second scene, and at this time, the same method is adopted to draw the video into the second scene, thereby resuming playing the video in the second scene.

The second playing unit 304 is configured to determine a corresponding second video segment according to the second progress information; invoke the preset video output interface, and render the second video segment into the video play window in the first scene so as to resume playing the video in the first scene.

In other words, the terminal determines the corresponding second video segment according to the acquired second progress information after shifting from the second scene back to the first scene, i.e., determines the video segment played in the first scene according to the second progress information, and furthermore, can invoke the preset video output interface (such as "setSurface( )") through the multimedia player and render the second video segment into the first scene through the preset video output interface.

It is noted that the terminal also invokes the preset video output interface in the first scene through the multimedia player and renders the video to be played into the first scene before shifting from the second scene back to the first scene.

As an implementation manner, the terminal enters the first scene after the user triggers the terminal to shift from the second scene back to the first scene, and the same method is adopted to draw the video into the first scene, i.e., directly output the video in the video play window after determining the video to be played in the current scene according to the second progress information of the video played in the second scene, thereby resuming playing the video in the first scene. Compared with the condition that the user needs to manually replay the video and the terminal reloads the video in the existing scene shift process, the technical solutions according to the embodiments of the present disclosure are more convenient, and have better video play efficiency and play effect.

It may be understood that many ways can be used for determining the video play window in the first scene according to the first position information, for example, in some implementation manners, the first determination unit 303 may be configured to acquire a corresponding window link address according to the first position information; and jump to the video play window in the first scene according to the window link address.

For example, establish the corresponding relation between the video play window in the first scene and the window link address in advance, such as a relation mapping table in which the video play window can be identified as "01"; and search the identifier "01" corresponding to the window link address in the mapping table when the terminal acquires the window link address, such URL, thereby quickly jumping to the video play window in the first scene.

For another example, in some implementation manners, the first determination unit 303 may be configured to acquire a corresponding positioning point according to the first position information; and determine the video play window in the first scene according to the positioning point.

For example, the first position information may include window end points, a window center point and other position information, and the terminal acquires the corresponding positioning point according to the first position information, thereby determining the corresponding video play window in the first scene.

Figure 3B:
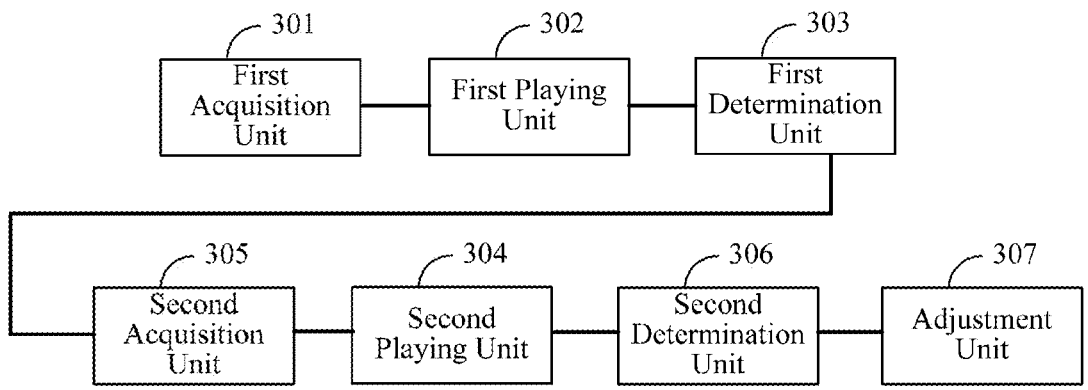
FIG. 3b is another structural schematic diagram of the video play device according to the third embodiment of the present disclosure.

Please refer to FIG. 3*b* which is another structural schematic diagram of the video play device according to the embodiment of the present disclosure. The device may also include:

a second acquisition unit 305, configured to acquire second position information, the second position information being position information of the video play window in the second scene; and a second determination unit 306, configured to determine the video play window in the second scene according to the second position information when the video play scene shifts from the first scene to the second scene.

In some implementation manners, the terminal can record and store the first position information when shifting from the first scene to the second scene, and thus, can directly find the video play window of the video played in the current scene according to the recorded first position information when shifting from the second scene to the first scene, and at this time, the multimedia player can uninterruptedly draw the contents of the video into the first scene; in the meanwhile, the terminal needs to acquire the second progress information of the video played in the second scene, thereby determining the contents of the video played in the first scene.

As an implementation manner, the contents of the video can be replaced manually by the user or automatically by the terminal in the scene shift process. Since each video source may have a different size, the size and position of the view area of the video may change accordingly, and therefore, the device may also include: an adjustment unit 307, configured to adjust the size and position of a view area of the video play window according to the size of the played video.

In addition, the terminal can firstly record and save the first position information when shifting from the first scene to the second scene, and similarly, can firstly record and save the second position information when shifting from the second scene to the first scene, so as to directly find the corresponding video play window according to the first position information (or second position information) and play the video without reloading the video when shifting back to the first scene (or second scene).

Afterwards, the terminal can automatically clear the record of the first position information and/or the second position information when receiving an operating instruction for stopping video play, so as to release the storage space of the terminal.

When performing implementation, all the foregoing units can be implemented as an independent entity, or implemented as one or more entities by free combination, for example, the first acquisition unit 301 in the embodiment can be the position storage module in the second embodiment, the first playing unit 302 and the second playing unit 304 in the embodiment can be the multimedia play module in the second embodiment, and the first determination unit 303 in the embodiment can be the display module in the second embodiment, etc.; in addition, the foregoing units can be subjected to other types of division and combination, which is not limited herein; and refer to the foregoing embodiments of the method for the implementation of each unit, which is not further described herein.

The video play device can be integrated into a terminal and other devices, such as a mobile phone, a notebook computer, a tablet computer and the like.

In conclusion, according to the video play device in the embodiment, when the video play scene shifts from the second scene back to the first scene, since the video play window of the scene can be quickly determined according to the position information of the first scene, the player does not need to be reinitialized, and thus, video pictures can be output to the video play window of the first scene uninterruptedly, thereby implementing seamless shift of the play scenes and resuming of video play, improving the video play effect and reducing the data consumption.

Figure 4:
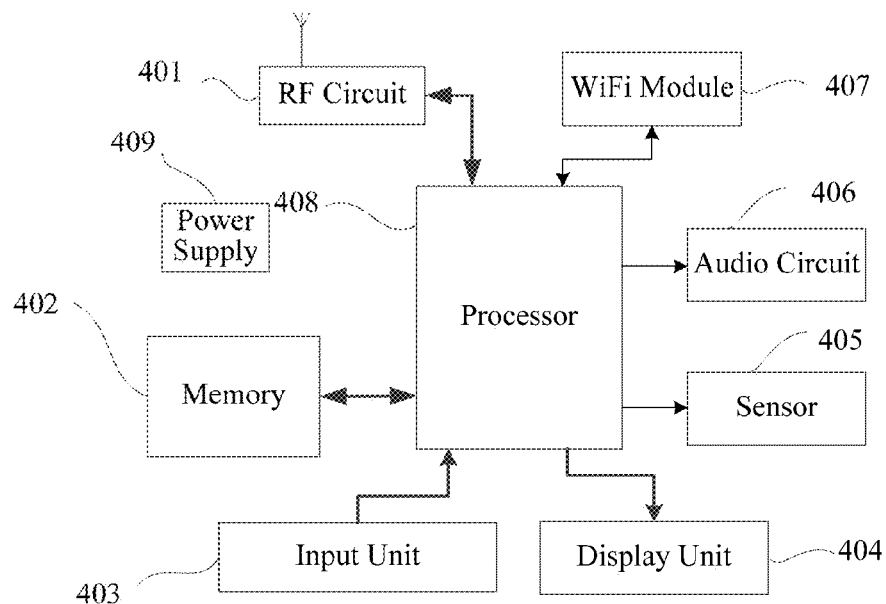
FIG. 4 is a structural schematic diagram of a terminal according to the sixth embodiment of the present disclosure.

The embodiments of the present disclosure also provide a terminal. As shown in FIG. 4, the terminal may include a radio frequency (RF) circuit 401, a memory 402 including one or more computer readable storage media, an input unit 403, a display unit 404, a sensor 405, an audio circuit 406, a Wireless Fidelity (WiFi) module 407, a processor 408 including one or more processing cores, a power supply 409 and the like. A person skilled in the art may understand that the structure of the terminal shown in FIG. 4 does not constitute a limitation to the terminal, and the terminal may include more components or fewer components than those shown in the figure, or some components may be combined, or a different component deployment may be used. Wherein:

The RF circuit 410 may be configured to receive and send signals during an information receiving and sending process or a call process. Particularly, the RF circuit 410 receives downlink information from a base station, then delivers the downlink information to one or more processors 408 for processing, and sends related uplink data to the base station. Generally, the RF circuit 401 includes, but not limited to, an antenna, at least one amplifier, a tuner, one or more oscillators, a subscriber identity module (SIM) card, a transceiver, a coupler, a low noise amplifier (LNA), and a duplexer. In addition, the RF circuit 410 may also communicate with a network and other devices by wireless communication. The wireless communication may use any communication standard or protocol, which includes, but not limited to, Global System for Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 402 may be configured to store a software program and module. The processor 408 runs the software program and module stored in the memory 402, so as to implement various functional applications and data processing. The memory 402 may mainly include a program storage area and a data storage area. The program storage area may store an operating system, an application program required by at least one function (such as a sound playback function and an image display function), and the like. The data storage area may store data (such as audio data and an address book) created according to use of the terminal, and the like. In addition, the memory 402 may include a high speed random access memory, and may also include a non-volatile memory such as at least one magnetic disk storage device, a flash memory, or other volatile solid-state storage device. Correspondingly, the memory 402 may further include a memory controller, so as to provide access of the processor 408 and the input unit 403 to the memory 402.

The input unit 403 may be configured to receive input digit or character information, and generate a keyboard, mouse, joystick, optical, or track ball signal input related to the user setting and function control. Specifically, in one embodiment, the input unit 403 may include a touch-sensitive surface and other input device. The touch-sensitive surface, which may also be referred to as a touch display screen or a touch panel, may collect a touch operation of a user on or near the touch-sensitive surface (such as an operation of a user on or near the touch-sensitive surface by using any suitable object or accessory, such as a finger or a stylus), and drive a corresponding connection apparatus according to a preset program. Optionally, the touch-sensitive surface may include two parts: a touch detection apparatus and a touch controller. The touch detection apparatus detects the touch orientation of the user and a signal brought about by the touch operation, and sends the signal to the touch controller; the touch controller receives touch information from the touch detection apparatus, converts the touch information into touch spot coordinates, and sends the touch spot coordinates to the processor 408, the touch controller can also receive and execute a command sent from the processor 408. In addition, the touch-sensitive surface can be implemented by various types, such as resistance, capacitance, infrared ray and surface acoustic wave. Except the touch-sensitive surface, the input unit 403 can also include other input devices. Specifically, other input devices may include, but not limited to, one or more of physical keyboard, function key (such as volume control key, on/off key and the like), track ball, mouse, joystick, and the like.

The display unit 404 may be configured to display information input by the user or information provided for the user, and various graphical user interfaces of the terminal. The graphical user interfaces may be formed by a graph, a text, an icon, a video, or any combination thereof. The display unit 404 may include a display panel. Optionally, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 408, so as to determine the type of the touch event. Then, the processor 408 provides a corresponding visual output on the display panel according to the type of the touch event. Although, in FIG. 4, the touch-sensitive surface and the display panel are used as two separate parts to implement input and output functions, in some embodiments, the touch-sensitive surface and the display panel may be integrated to implement the input and output functions.

The terminal may further include at least one sensor 405, such as an optical sensor, a motion sensor, and other sensors. Specifically, the optical sensor may include an ambient light sensor and a proximity sensor. The ambient light sensor can adjust luminance of the display panel according to brightness of the ambient light. The proximity sensor may switch off the display panel and/or backlight when the terminal is moved to the ear. As one type of motion sensor, a gravity acceleration sensor can detect magnitude of acceleration in various directions (generally on three axes), may detect magnitude and direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal, are not further described herein.

The audio circuit 406, a loudspeaker, and a microphone may provide audio interfaces between the user and the terminal. The audio circuit 406 may transmit a converted electric signal of the received audio data to the loudspeaker. The loudspeaker converts the electric signal into a sound signal for output. On the other hand, the microphone converts a collected sound signal into an electric signal. The audio circuit 406 receives the electric signal and converts the electric signal into audio data, and outputs the audio data to the processor 408 for processing. Then, the processor 408 sends the audio data to, for example, another terminal device by using the RF circuit 401, or outputs the audio data to the memory 402 for further processing. The audio circuit 406 may further include an earplug jack, so as to provide communication between a peripheral earphone and the terminal.

WiFi is a short distance wireless transmission technology. The terminal may help, by using the WiFi module 407, the user to receive and send e-mails, browse a webpage, access streaming media, and so on, which provides wireless broadband Internet access for the user. Although FIG. 4 shows the WiFi module 407, it may be understood that the WiFi module 407 is not a necessary component of the terminal, and when required, the WiFi module 407 may be omitted as long as the scope of the essence of the present disclosure is not changed.

The processor 408 is the control center of the terminal, and is connected with various parts of the mobile phone by using various interfaces and lines. By running or executing the software program and/or module stored in the memory 402, and invoking data stored in the memory 402, the processor 408 performs various functions of the terminal and data processing, thereby performing overall monitoring on the mobile phone. Optionally, the processor 408 may include one or more processing cores. In some embodiments, the processor 408 may integrate an application processor and a modem. The application processor mainly processes an operating system, a user interface, an application program, and the like. The modem mainly processes wireless communication. It may be understood that the foregoing modem may also not be integrated into the processor 408.

The terminal also includes the power supply 409 (such as a battery) which is used for supplying power for each component. As an implementation manner, the power supply can be in logic connection with the processor 408 through a power management system, so as to realize functions of charging and discharging management and power consumption management through the power management system. The power supply 409 may further include any component of at least one direct current of alternating current power supply, a recharging system, a power failure detection circuit, a power adapter or inverter, a power status indicator and the like.

Although not shown in the figure, the terminal may further include a camera, a Bluetooth module, and the like, which are not further described herein. Specifically, in this embodiment, the processor 408 in the terminal may load an executable file corresponding to the progress of at least one application program into the memory 402 according to the following instructions and run the application program stored in the memory 402, thereby implementing various functions:

acquiring first progress information and first position information of a video played in a first scene when the video play scene shifts from the first scene to a second scene, the first position information being position information of a video play window in the first scene; resuming playing the video according to the first progress information in the second scene; determining the video play window in the first scene according to the first position information and acquiring second progress information of the video played in the second scene when the video play scene shifts from the second scene back to the first scene; and resuming playing the video in the video play window in the first scene according to the second progress information.

As an implementation manner, the processor 408 may also be configured to determine a corresponding first video segment according to the first progress information; and invoke the preset video output interface, and render the first video segment into the second scene so as to resume playing the video in the second scene.

As an implementation manner, the processor 408 may also be configured to determine a corresponding second video segment according to the second progress information; and invoke the preset video output interface, and render the second video segment into the video play window in the first scene so as to resume playing the video in the first scene.

As an implementation manner, the processor 408 may also be configured to acquire a corresponding window link address according to the first position information; and jump to the video play window in the first scene according to the window link address.

As an implementation manner, the processor 408 may also be configured to acquire a corresponding positioning point according to the first position information; and determine the video play window in the first scene according to the positioning point.

As an implementation manner, the processor 408 may also be configured to acquire second position information, the second position information being position information of the video play window in the second scene; and determine the video play window in the second scene according to the second position information when shifting from the first scene to the second scene.

As an implementation manner, the processor 408 may also be configured to adjust the size and position of the view area of the video play window according to the size of the played video.

In conclusion, according to the terminal provided by the embodiment, when the video play scene shifts from the second scene back to the first scene, since the video play window of the scene can be quickly determined according to the position information of the first scene, the player does not need to be reinitialized, and thus, video pictures can be output to the video play window of the first scene uninterruptedly, thereby implementing seamless shift of the play scenes and resuming of video play, improving the video play effect and reducing the data consumption.

In the foregoing embodiments, the description of each embodiment has its own focus. For the parts that are not described in detail in a certain embodiment, please refer to detailed description on the video play method above, and these parts are not further described herein.

The video play device according to the embodiments of the present disclosure, such as a computer, a tablet computer, a mobile phone with a touch function or the like, is based on the same concept as the video play method in the embodiment above. The video play device can run any method according to the embodiments of the video play method. For the implementation process, refer to the embodiments of the video play method, and the details are not described herein again.

In the several embodiments provided by the present disclosure, it should be understood that the disclosed method and device may be implemented in other manners. The device embodiments described above are merely exemplary, e.g., the division of the modules is only a logic function division, other division manners may exist in practical implementation, for example, a plurality of modules or components may be combined or integrated to another system, or some features may be omitted or not implemented. In addition, the displayed or discussed communication connection among the components may be indirect coupling or communication connection of equipment or modules through some interfaces, and may be in electrical, mechanical or other forms.

The modules described as separate components may be separated physically or not, components displayed as modules may be physical modules or not, namely, may be located in one place, or may also be distributed on a plurality of network modules. A part of or all of the modules may be selected to implement the purposes of the solutions of the embodiments according to actual demand.

In addition, the functional modules in the embodiments of the present disclosure may be integrated in a processing module, or the modules singly exist physically, or two or more modules are integrated in one module. The above-mentioned integrated module may be implemented in a hardware form and may also be implemented in the form of hardware plus a software functional module.

Ordinary personnel skilled in the art may understand that all or some of the steps of the foregoing embodiments may be implemented by using hardware related to program instructions. The foregoing program may be stored in a computer readable storage medium. When executing the program, the steps included in the foregoing method embodiments are executed. The foregoing storage medium includes a variety of media capable of storing program codes, such as a removable storage device, a read-only memory (ROM), a magnetic disk, an optical disk or the like.

Or, if the integrated module according to the embodiments of the present disclosure is implemented in the form of the software functional module and is sold or used as an independent product, it may be stored in a computer readable storage medium. Based on this understanding, the technical solutions according to the embodiments of the present disclosure substantially, or the part contributing to the existing technology may be implemented in the form of a software product. The computer software product is stored in a storage medium, and includes a plurality of instructions enabling a computer device (may be a personnel computer, a server, or a network device or the like) to execute all or a part of the methods in the embodiments of the present disclosure. The foregoing storage medium includes a variety of media capable of storing program codes, such as a removable storage device, an ROM, a magnetic disk, an optical disk or the like.

The memory switching method and device recorded in the embodiments of the present disclosure are only exemplified by the foregoing embodiments, but are not limited thereto. It should be understood by those of ordinary personnel skilled in the art that modifications may still be made to the technical solutions recorded in the aforementioned embodiments, or equivalent substitutions may be made to a part or all of technical features thereof; and these modifications or substitutions do not make the essence of the corresponding technical solutions depart from the spirit and scope of the technical solutions of the embodiments of the present disclosure.

The foregoing descriptions are exemplary embodiments of the present disclosure, but are not intended to limit the protection scope of the present disclosure.

INDUSTRIAL APPLICABILITY

According to the technical solution in the embodiments, when the video play scene shifts from the second scene back to the first scene, since the video play window of the scene can be quickly determined according to the position information of the first scene, the player does not need to be reinitialized, and thus, video pictures can be output to the video play window of the first scene uninterruptedly, thereby implementing seamless shift of the play scenes and resuming of video play, improving the video play effect and reducing the data consumption.

What is claimed is:

1. A method for playing a video, including:
    acquiring, by processing circuitry of an apparatus, and when the video is switched from being played in a first application interface to being played in a second application interface on a display screen for the apparatus, first progress information and first position information of the video in the first application interface, the first position information being indicative of position information of a first video playback window for the video in the first application interface;
    resuming playing the video according to the first progress information in the second application interface;
    acquiring, when the video is switched from being played in the second application interface to being played in the first application interface, second progress information of the video in the second application interface;
    determining the first video playback window in the first application interface according to the first position information; and
    resuming playing the video in the first video play window in the first application interface according to the second progress information.

2. The method according to claim 1, wherein the resuming playing the video according to the first progress information in the second application interface comprises:
    determining a first video segment of the video according to the first progress information;
    configuring the second application interface as a video output interface; and
    outputting the first video segment to the video output interface to resume playing the video in the second application interface.

3. The method according to claim 2, wherein the resuming playing the video in the first video play window in the first application interface according to the second progress information comprises:
    determining a second video segment in the video according to the second progress information;
    configuring the first application interface as the video output interface; and
    outputting the second video segment to the video output interface to resume playing the video in the first application interface.

4. The method according to claim 1, wherein the determining the first video playback window in the first application interface according to the first position information comprises:
    acquiring a window link address from the first position information; and
    switching to the first video playback window in the first application interface according to the window link address.

5. The method according to claim 1, wherein the determining the first video playback window in the first application interface according to the first position information comprises:
    acquiring a positioning point according to the first position information; and
    determining the first video playback window in the first application interface according to the positioning point.

6. The method according to claim 1, wherein before the video is switched from being played in the second application interface to being played in the first application interface, the method further includes:
    acquiring second position information, the second position information being indicative of position information of a second video playback window for the video in the second application interface.

7. The method according to claim 6, wherein after the resuming playing the video in the first video playback window in the first application interface according to the second progress information, the method comprises:
    determining the second video playback window in the second application interface according to the second position information when the video is switched from being played in the first application interface to being played in the second application interface.

8. The method according to claim 1, wherein the method further comprises:
adjusting a size and a position of a view area of the first video playback window according to a size of the video.

9. An apparatus, comprising:
interface circuitry configured to output signals to a display screen; and
processing circuitry configured to:
acquire, when a video is switched from being played in a first application interface to being played in a second application interface on the display screen, first progress information and first position information of the video in the first application interface, the first position information being indicative of position information of a first video playback window for the video in the first application interface;
resume playing the video according to the first progress information in the second application interface;
acquire, when the video is switched from being played in the second application interface to being played in the first application interface, second progress information of the video in the second application interface;
determine the first video playback window in the first application interface according to the first position information; and
resume playing the video in the first video playback window in the first application interface according to the second progress information.

10. The apparatus according to claim 9, wherein the processing circuitry is configured to:
determine a first video segment of the video according to the first progress information; and
configure the second application interface as a video output interface; and
output the first video segment to the video output interface to resume playing the video in the second application interface.

11. The apparatus according to claim 10, wherein the processing circuitry is configured to:
determine a second video segment in the video according to the second progress information; and
configure the first application interface as the video output interface; and
output the second video segment to the video output interface to resume playing the video in the first application interface.

12. The apparatus according to claim 9, wherein the processing circuitry is configured to:
acquire a window link address from the first position information; and
switch to the first video playback window in the first application interface according to the window link address.

13. The apparatus according to claim 9, wherein the processing circuitry is configured to:
acquire a positioning point according to the first position information; and
determine the first video playback window in the first application interface according to the positioning point.

14. The apparatus according to claim 9, wherein before the video is switched from being played in the second application interface to being played in the first application interface, the processing circuitry is configured to:
acquire second position information, the second position information being indicative of position information of a second video playback window for the video in the second application interface.

15. The apparatus according to claim 14, wherein after the resuming playing the video in the first video playback window in the first application interface according to the second progress information, the processing circuitry is configured to:
determine the second video playback window in the second application interface according to the second position information when the video is switched from being played in the first application interface to being played in the second application interface.

16. The apparatus according to claim 9, wherein the processing circuitry is configured to
adjust a size and a position of a view area of the first video playback window according to a size of the video.

17. A non-transitory computer-readable medium storing instructions which when executed by a computer cause the computer to perform:
acquiring, when a video is switched from being played in a first application interface to being played in a second application interface on a display screen, first progress information and first position information of the video in the first application interface, the first position information being indicative of position information of a first video playback window for the video in the first application interface;
resuming playing the video according to the first progress information in the second application interface;
acquiring, when the video is switched from being played in the second application interface to being played in the first application interface, second progress information of the video in the second application interface;
determining the first video playback window in the first application interface according to the first position information; and
resuming playing the video in the first video playback window in the first application interface according to the second progress information.

18. The non-transitory computer-readable medium of claim 17, wherein to resume playing the video according to the first progress information in the second application interface, the instructions cause the computer to perform:
determining a first video segment of the video according to the first progress information; and
configuring the second application interface as a video output interface; and
outputting the first video segment to the video output interface to resume playing the video in the second application interface.

19. The non-transitory computer-readable medium of claim 18, wherein to resume playing the video in the first video playback window in the first application interface according to the second progress information, the instructions cause the computer to perform:
determining a second video segment in the video according to the second progress information; and
configuring the first application interface as the video output interface; and
outputting the second video segment to the video output interface to resume playing the video in the first application interface.

20. The non-transitory computer-readable medium of claim 17, wherein to determine the first video playback window in the first application interface according to the first position information, the instructions cause the computer to perform:
   acquiring a window link address from the first position information; and
   switching to the first video playback window in the first application interface according to the window link address.

* * * * *